United States Patent [19]

Oikawa et al.

[11] Patent Number: 5,504,622
[45] Date of Patent: Apr. 2, 1996

[54] APPARATUS FOR HEAD UP DISPLAY COMPRISING A PARABOLIC REFLECTIVE MIRROR

[75] Inventors: Kohki Oikawa; Tomonari Ishikawa, both of Omiya, Japan

[73] Assignee: Kansei Corporation, Omiya, Japan

[21] Appl. No.: 214,264

[22] Filed: Mar. 17, 1994

[30] Foreign Application Priority Data

Mar. 18, 1993 [JP] Japan .................................... 5-058759

[51] Int. Cl.$^6$ .............................. G02B 27/14; G09G 5/00
[52] U.S. Cl. .......................... 359/630; 359/631; 359/637; 345/7
[58] Field of Search .................................... 359/630, 631, 359/632, 633, 634, 13, 14, 637, 838; 345/7, 9; 348/118

[56] References Cited

U.S. PATENT DOCUMENTS

| | | | |
|---|---|---|---|
| 3,848,974 | 11/1974 | Hosking | 359/858 |
| 4,761,056 | 8/1988 | Evans | 359/631 |
| 5,006,072 | 4/1991 | Letovsky | 434/61 |
| 5,289,315 | 2/1994 | Makita | 359/634 |

FOREIGN PATENT DOCUMENTS 4-56633  2/1992  Japan .

*Primary Examiner*—Georgia Y. Epps
*Assistant Examiner*—Ricky Mack
*Attorney, Agent, or Firm*—Keck, Mahin & Cate

[57] ABSTRACT

The present invention provides an apparatus for a head up display for the use of a motor vehicle, which can make a presentation of an image information in a remote place and which can remove a height-wise positional displacement of a double image and distortion of the double image caused by the curved shape of a vehicle front glass to the extent possible. In the apparatus for a head up display for the use of a motor vehicle according to the present invention, a projector (3) has a middle mirror (6) for reflecting an image information (9) such as characters or marks toward a reflective face. The middle mirror (6) includes a portion (18) of the parabolic reflective face which is located away from a main axis of a parabolic mirror. The portion (18) of the parabolic reflective face includes a first curved surface having a small curvature, corresponding to that portion of a vehicle front glass (2) which has a large curvature, and a second curved surface having a large curvature, corresponding t that portion of the vehicle front glass (2) which has a small curvature, so that distortion of the image information due to difference in curvature of the vehicle front glass (2) is corrected and a height-wise positional displacement of a double image, which may occur when the image information is looked through a pair of eyes (10) and (11) of a person riding on the motor vehicle, is corrected.

5 Claims, 9 Drawing Sheets

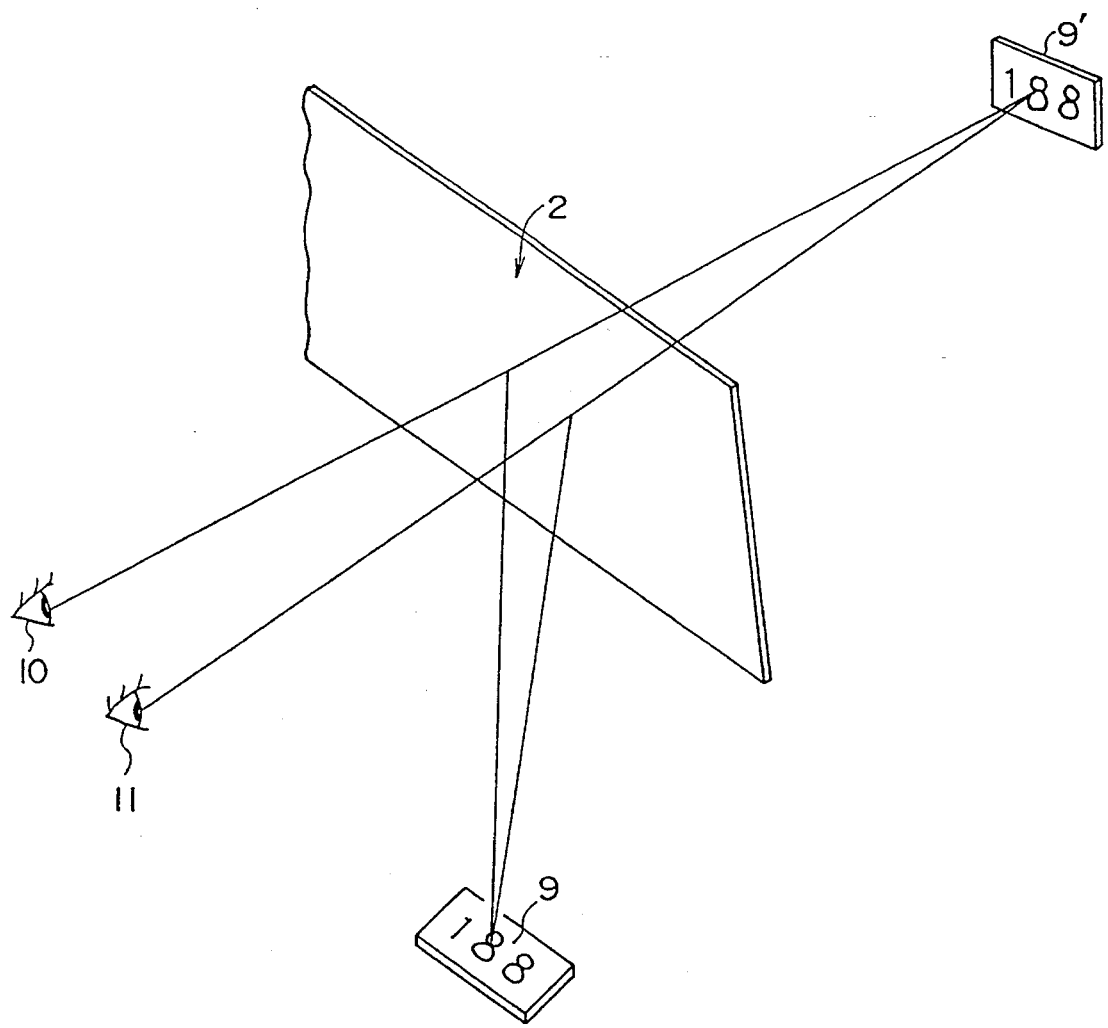

APPARATUS FOR HEAD UP DISPLAY COMPRISING A PARABOLIC REFLECTIVE MIRROR

BACKGROUND OF THE INVENTION

1. Field of the Invention

This invention relates to an Improvement of an apparatus for a head up display for the use In a motor vehicle, in which image information, such as characters or marks is presented forwardly of a front window or front glass of a motor vehicle in an overlapped relation to the foreground.

2. Prior Art

Heretofore, there is known an apparatus for a head up display for the use in a motor vehicle, in which image information such as characters or marks is presented forwardly of a front window or front glass of a motor vehicle in an overlapped relation to the foreground. A construction as shown in FIG. 1, for example, is known for this type of an apparatus for a head up display.

In FIG. 1, reference numeral 1 denotes an instrument panel; and 2, a front glass of a motor vehicle, respectively. A projection means 3 is disposed inside the instrument panel 1. This projector 3 includes a meter display 4 for displaying a vehicle information for a driver. This meter display 4 comprises, among others, a bright fluorescent character display tube (VFD) and a liquid crystal display (LCD), for example. A combiner 5 is formed on the front glass 2 by coating. The combiner 5 is a semitransparent reflective face having a reflective Index of 25% to 50%, for example. The projector 3 further includes a plane mirror serving as a middle mirror 6. The image information (vehicle speed, etc.) such as characters or marks displayed in the meter display 4 is reflected by the plane mirror 6 and introduced to the combiner 5 through a transparent cover 7 adapted to prevent dust. This image information is then reflected by the combiner 5 in a direction where a pair of eyes of a person riding on the motor vehicle (for example, driver) are present. The person driving in the motor vehicle can visually recognize the image information as if the image information (as represented by reference numeral 8) were present forwardly of the driver's seat, i.e., forwardly of the front glass 2. In other words, a virtual image 8 of the image information is formed forwardly of the front glass 2.

In the case where the front glass 2 is a planar glass as shown in FIG. 2, the image information. 9, even if reflected by this front glass 2, is not distorted (that is, the image information is visually recognized in a non-distorted condition) in accordance with the principles of reflection. In FIG. 2, reference numeral 10 denotes a left eye of the person riding in the motor vehicle; 11, a right eye of the person riding in the motor vehicle; and 9', a virtual image corresponding to the image information 9, respectively.

Actually, however, the front glass 2 has a configuration which is curved in a three dimensional direction and functions as a concave mirror (see FIGS. 3 and 4). Opposite side portions of the front glass 2 in the sense of a lateral direction are proportionally increased in curvature toward opposite side edges thereof. Similarly, opposite side portions of the front glass 2 in the sense of a vertical direction are proportionally increased in curvature toward upper and lower edges thereof. On the other hand, a central portion of the front glass 2 is generally constant in curvature. In the case where the front glass 2 is curved like this, let us presume here that a luminous flux P1 emitted from one point Q on the image information 9 reflected by the front glass 2 at a reflection portion R1 thereof and made incident to the left eye 10. At this time, a luminous flux P2 emitted from the one point Q is reflected by the front glass 2 and made incident to the right eye 11 which is located at the same level of height as the left eye 10. A reflection portion on the front glass 2 for this luminous flux P2 is represented by R2. The curvature of the front glass 2 is larger proportionally increased toward the edges of the front glass. Accordingly, the reflection portion R2 is height-wise displaced relative to the reflection portion R1. In FIG. 4, reference character H denotes an amount of the height-wise displacement between the reflection portion R1 and the reflection portion R2. Since the distortion (magnification) of the image information when looked through the left eye 10 which is located on the side where the curvature of the front glass 2 is small, is negligible, If any, because the front glass 2 can be regarded almost as a plane. However, the distortion (magnification) of the image information when looked through the right eye 11 which is located on the side where the curvature of the front glass 2 is large, is rather increased because the front glass 2 strongly exhibits its function as a concave mirror.

As a result, as shown schematically in FIG. 5, a virtual image originating from the image information 9 is visually recognized as represented by reference numeral 9a on the side of the left eye 10, and as represented by reference numeral 9b on the side of the right eye 11. In other words, the person riding in the motor vehicle looks at two overlapping virtual images (double image) 9a and 9b which are vertically and horizontally displaced and distorted. In this case, the horizontal displacement of the virtual images 9a and 9b can be corrected by the function of the brain of the person looking the virtual images. However, the vertical displacement of the virtual images 9a and 9b is impossible to be corrected by the function of the brain. As a result, the person riding in the motor vehicle tends to have such unpleasant feeling as eye fatigue ready to occur, uneasy feel or the like.

In order to correct the height-wise positional displacement of the virtual images 9a and 9b, there can be contemplated the use of a spherical concave mirror 12 as shown in FIGS. 6 and 7. However, if the concave mirror 12 is employed, there is a possibility that the imaging place is proportionally greatly displaced as it goes away from an optical axis O. That is, the concave mirror 12 generally has such an optical characteristic as aberration. Specifically, as shown in FIG. 6, parallel rays S1 near the optical axis O are converged to a place near a focal point f. On the other hand, parallel rays S2 remote from the optical axis S2 are converged to a place away from the focal point f. Accordingly, although the height-wise positional displacement of the image can be removed by the concave mirror 12, the distortion of the image cannot be removed. In FIG. 6, reference character C denotes a center of the curvature of the concave mirror 12, and in FIG. 7, reference numeral 13 denotes an object and 14, a virtual image of the object 13 produced by the function of the concave mirror 12.

It is also contemplated to remove the height-wise positional displacement of the double image using a convex mirror (for example, Japanese Patent Application No. Hei 2-167507; Filing date: Jun. 26, 1990; Title of the Invention: apparatus for a head up display (Japanese patent laid-open No. Hei 4-56633)). However, this apparatus has the shortcoming that the image information cannot be presented in a remote place due to optical characteristic of its convex lens.

SUMMARY OF THE INVENTION

The present invention has been accomplished in view of the above situation. It is therefore an object of the present invention to provide an apparatus for a head up display for the use in a motor vehicle which is capable of presenting image information in a remote place and which is also capable of removing a height-wise positional displacement (height-wise parallax) of a double image and distortion of the image caused by a curved configuration of the vehicle front glass to the possible extent.

According to the present invention, there is provided, in order to achieve the above object, an apparatus for a head up display for the use in a motor vehicle, comprising:

a curved front glass;

a reflective face formed in the curved front glass;

image information such as characters or marks;

a projector for projecting the image information, the image information projected by the projector being reflected on the reflective face in a direction where a pair of eyes of a person riding in the motor vehicle are present, so as to present the image information forwardly of the front glass; and a middle mirror mounted on the projector and adapted to reflect the image information toward the reflective face, the middle mirror including a portion of the parabolic reflective face located spaced away from a main axis of a parabolic mirror.

Preferably, the portion of the parabolic reflective face includes a first curved surface having a small curvature, corresponding to that portion of the front glass which has a large curvature, and a second curved surface having a large curvature, corresponding to that portion of the front glass which has a small curvature, so that distortion of the image information due to difference in curvature of the front glass is corrected and a height-wise positional displacement of a double image, which may occur when the image information is looked through the pair of eyes of the person riding in the motor vehicle, is corrected.

According to the apparatus for a head up display for the use in a motor vehicle of the present invention, when the front glass and the portion of the parabolic reflective face are considered as a unitary optical reflective member, any part of the reflective face, as a whole, exhibits the same magnifying power and therefore, the distortion of the image information can be corrected. Also, owing to the arrangement in that the portion of the parabolic reflective face includes the first portion having a small curvature and the second portion having a large curvature, the height-wise positional displacement of the double image, which may occur when the image information is looked through the pair of eyes, can be corrected by properly adjusting the position of the portion of the parabolic reflective face such that the ray of light emitted from one point on the image information is reflected by the front glass at its portions of the same level of height so as to enter the pair of eyes. In the long run, this means that one piece of image information is recognized by the function of the brain of the person looking the image Information, and therefore, such unpleasant feeling as eye fatigue ready to occur, uneasy feel or the like, which may occur to the person riding the motor vehicle when he or she looks the image information, can be avoided.

Furthermore, according to the apparatus for a head up display for the use of a motor vehicle of the present invention, the image information can be presented in a remote place.

BRIEF DESCRIPTION OF THE DRAWINGS

FIG. 2 is a schematic view of a reflecting condition of an image information on a plane mirror serving as a front glass;

DESCRIPTION OF THE PREFERRED EMBODIMENT

One embodiment of an apparatus for a head up display for the use in a motor vehicle according to the present invention will now be described with reference to FIGS. 8 to 11.

Figure 8:
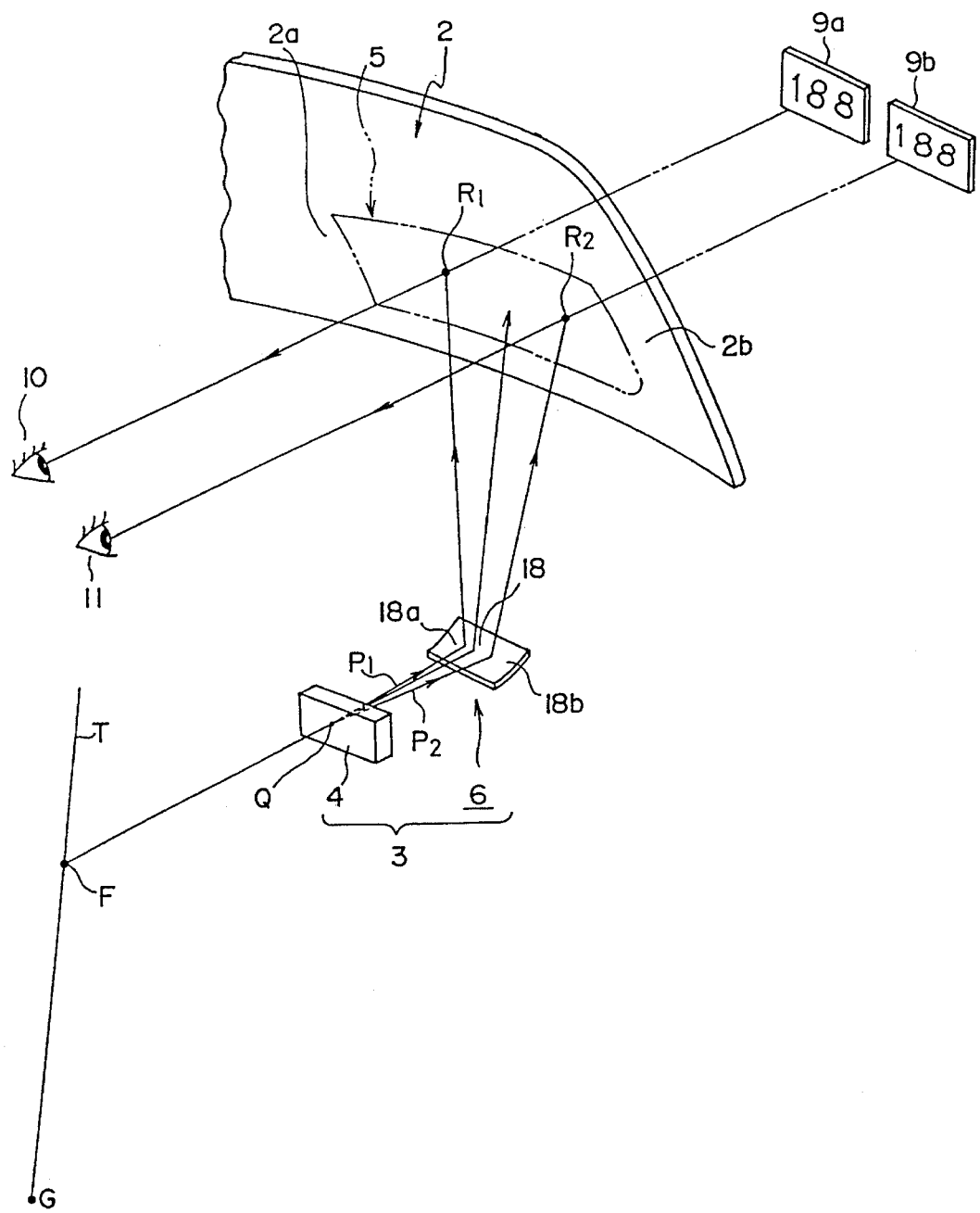
FIG. 8 is a schematic view showing a construction of an important portion of an apparatus for a head up display for the use in a motor vehicle according to one embodiment of the present invention.

In FIG. 8, like component elements of those of the prior art are denoted by like reference numerals and description thereof is omitted. Those portions which are different from the prior art will be described hereinafter.

Figure 9:
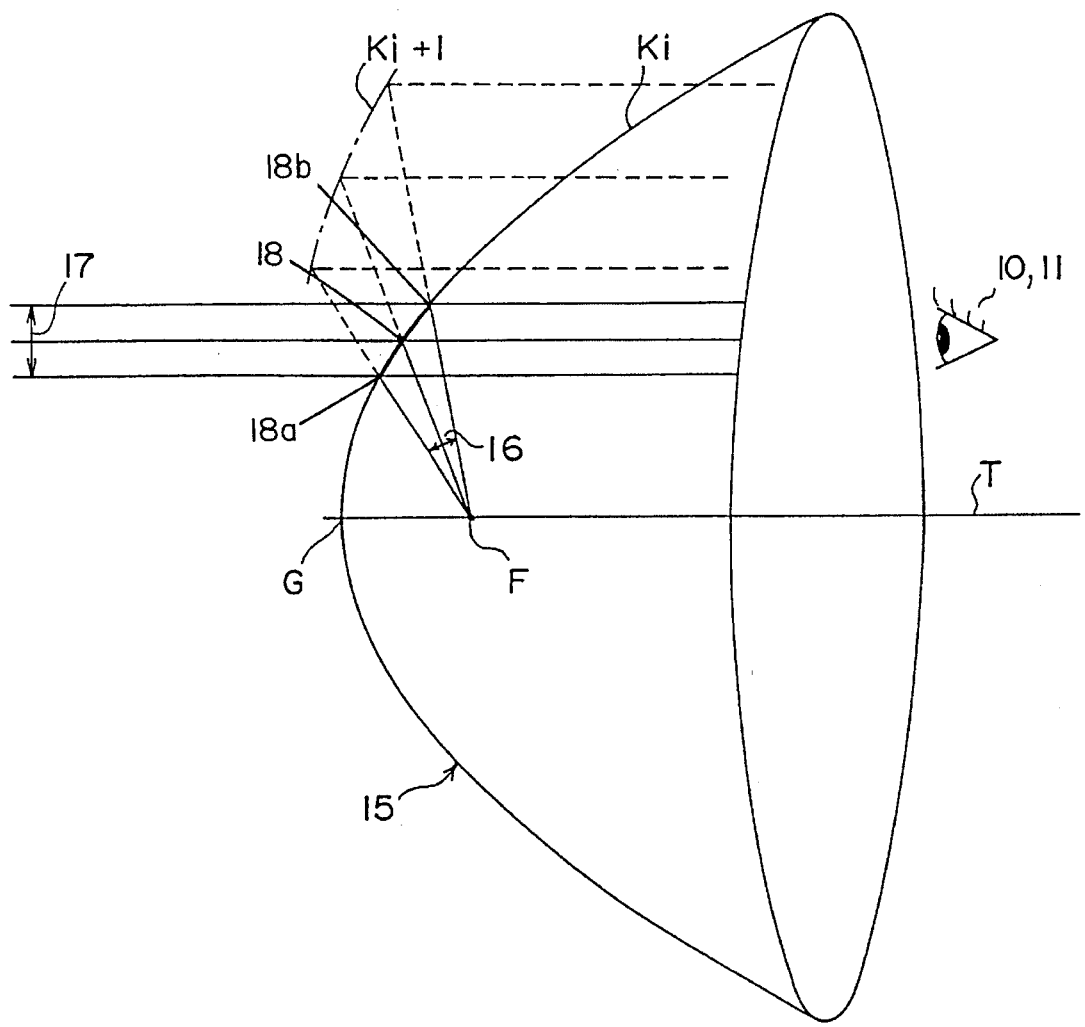
FIG. 9 is an explanatory view for explaining the optical characteristic of a parabolic mirror.
Figure 10:
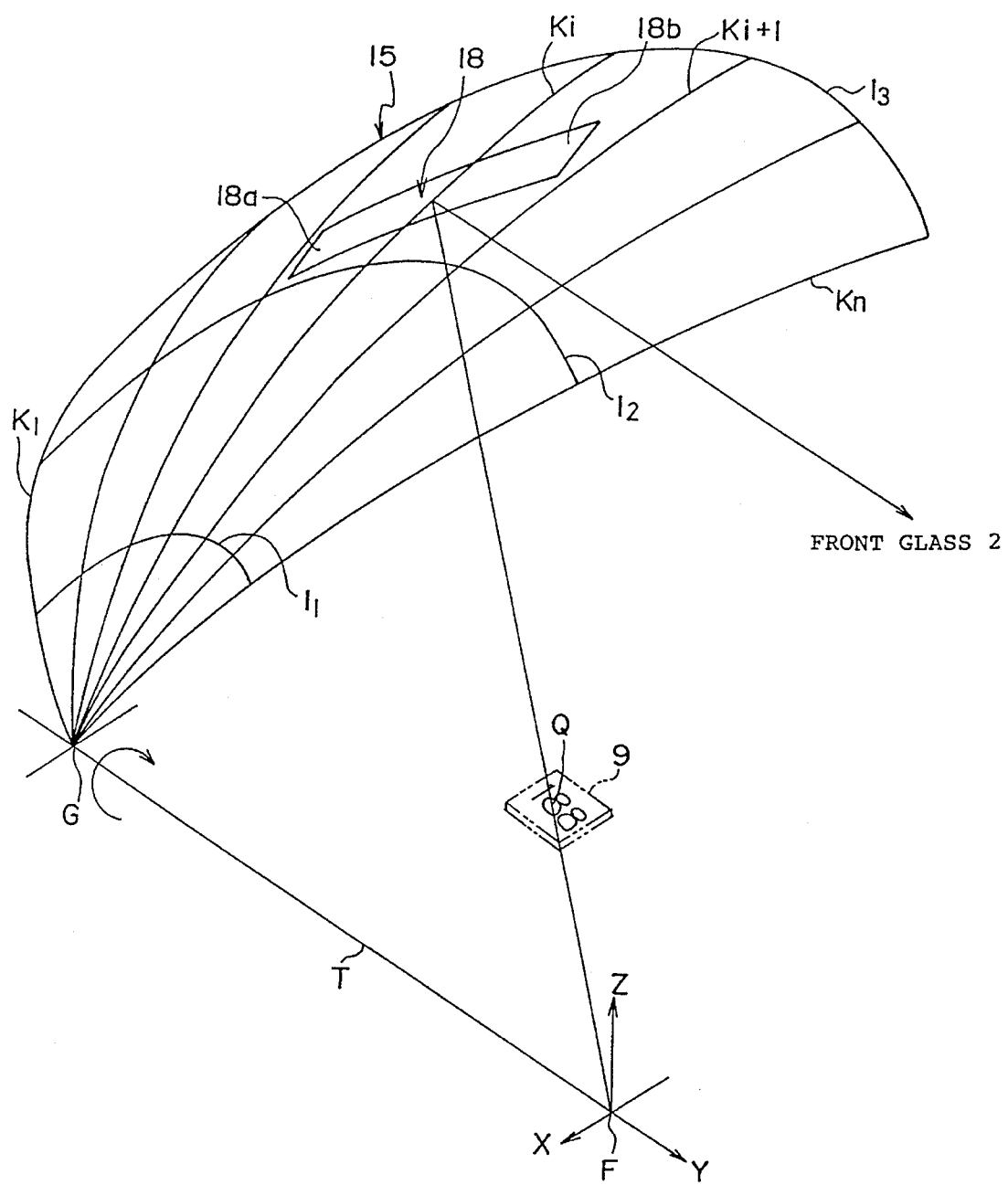
FIG. 10 is an explanatory view for explaining a portion of the parabolic mirror which is obtained by cutting away a part of the parabolic mirror according to the present invention and served as the middle mirror.

In the apparatus for a head up display for the use in a motor vehicle according to the present invention, the middle mirror 6 is comprised of a part of a parabolic mirror 15 as shown in FIGS. 9 and 10. Owing to the optical characteristic, the parabolic mirror 15 converts the luminous flux coming from a focal point F of a main axis T into parallel rays and reflects the same. If this characteristic of the parabolic mirror 15 is utilized, it is, in principle, possible to provide image information without generating aberration. That is, the image information is provided without distortion. In FIG. 9, reference numeral 16 denotes an object placed within the focal point F of the parabolic mirror 15, and reference numeral 17 denotes a virtual image of this object.

However, the curvature of the front glass 2 is partly different. Therefore, use of that portion of the parabolic mirror 15 which is the same in curvature results in distortion of the virtual image 17 (that is, image information) of the object 16. In order to remove the distortion of the virtual image 17 due to difference in curvature, a portion 18 of the parabolic reflective face having a different curvature and located outside the main axis T as shown in FIG. 10, is used. In FIG. 10, reference characters K1, ..., Ki, ki+1, ..., and Kn denote meridians of the parabolic mirror 15, respectively. Similarly, reference characters I1, I2 and I3 denote parallels of the parabolic mirror 15, respectively, and reference character G denotes an origin of the parabolic mirror 15. The parallels I1, I2, and I3 show the fact that the curvature of the parabolic mirror 15 becomes smaller as it goes away from the near side of the origin. The meridians Ki, ..., Ki, ki+1, ..., and Kn denote a turning of the parabola about the main axis T with reference to a plane (0 degree) including a Z-axis. Accordingly, the curvature of a portion 18 of the parabolic reflective face is large on the side 18a near the main axis T and small on the side 18b far from the main axis T. FIG. 9 shows a parabolic of the parabolic mirror 15 on the meridian Ki.

In FIG. 9, broken line Ki+1' denotes a part of the parabolic on the meridian Ki+1 of FIG. 10. As apparent from FIG. 9, by commonly using that portion of the parabolic mirror 15 which is large in curvature together with that portion of the parabolic mirror 15 which is small in curvature, the reflection height of the object 16 can be changed. This portion 18 of the reflective face is served as the middle mirror 6 and, as shown in FIG. 8, a near side 18a of the portion 18 of the reflective Face to the main axis T is brought into correspondence with a center side 2a of the front glass 2 which has a small curvature, and a remote side 18b from the main axis T is brought into correspondence with a peripheral portion 2b of the front glass 2 which have a large curvature. The portion 18 of the parabolic reflective face is placed in an optical path between a meter display 4 and the front glass 2 and properly adjusted its position such that rays P1 and P2 of light emitted from one point Q of the image information. 9 is reflected by the front glass 2 at its reflection portions R1 and R2 which are of the same level of height so as to enter a pair of eyes 10 and 11.

Figure 11:
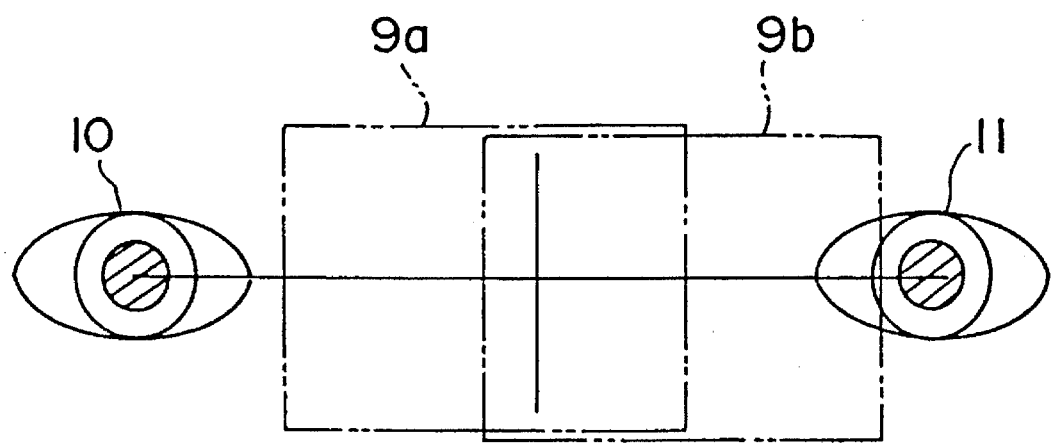
FIG. 11 is an explanatory view for explaining an image of an image information in which distortion and vertical (or height-wise) positional displacement are removed.

In this embodiment, the small curvature portion of the portion 18 of the parabolic reflective face is in correspondence with the large curvature portion of the front glass 2, and the large curvature portion of the portion 18 of the parabolic reflective face is in correspondence with the small curvature portion of the front glass 2. Accordingly, if the front glass 2 and the portion 18 of the parabolic reflective face are regarded as a unitary optical reflective member, any part of the reflecting surface, as a whole, exhibits the same magnifying power. Accordingly, the deflection of the image information 9 is corrected. With respect to the height-wise displacement of the double image occurrable when the image information 9 is observed through the pair of eyes 10 and 11, the position of the portion 18 of the parabolic reflective face is adjusted such that the rays P1 and P2 emitted from the one point Q of the image information 9 are reflected by the front glass 2 at its positions R1 and R2 of the same level of height so as to enter the pair of eyes 10 and 11. Accordingly, as shown in FIG. 11, two overlapping images (double image) 9a and 9b of the image information 9 can be observed in a condition where the height-wise positional displacement H and distortion are removed to the possible extent.

Figure 1:
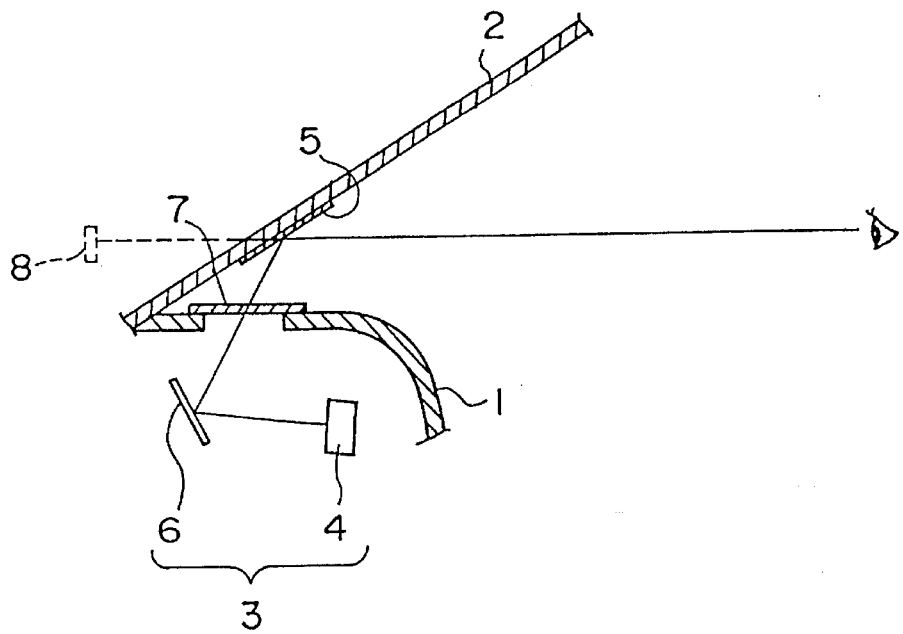
FIG. 1 is a cross-sectional view showing a general construction of a conventional apparatus for a head up display for the use in a motor vehicle.
Figure 3:
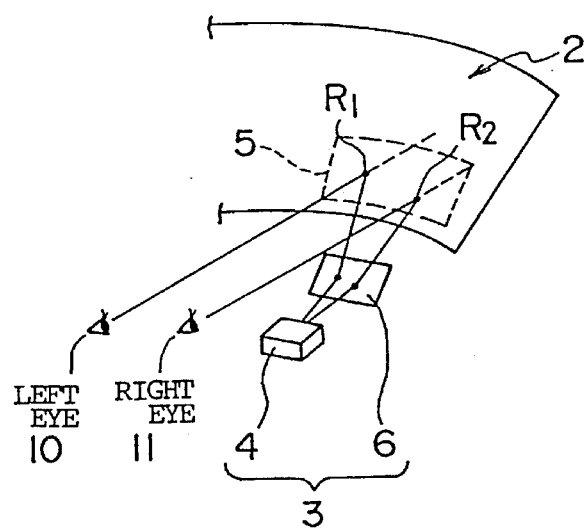
FIG. 3 is a perspective view showing a reflecting condition in the apparatus for a head up display of FIG. 1.
Figure 4:
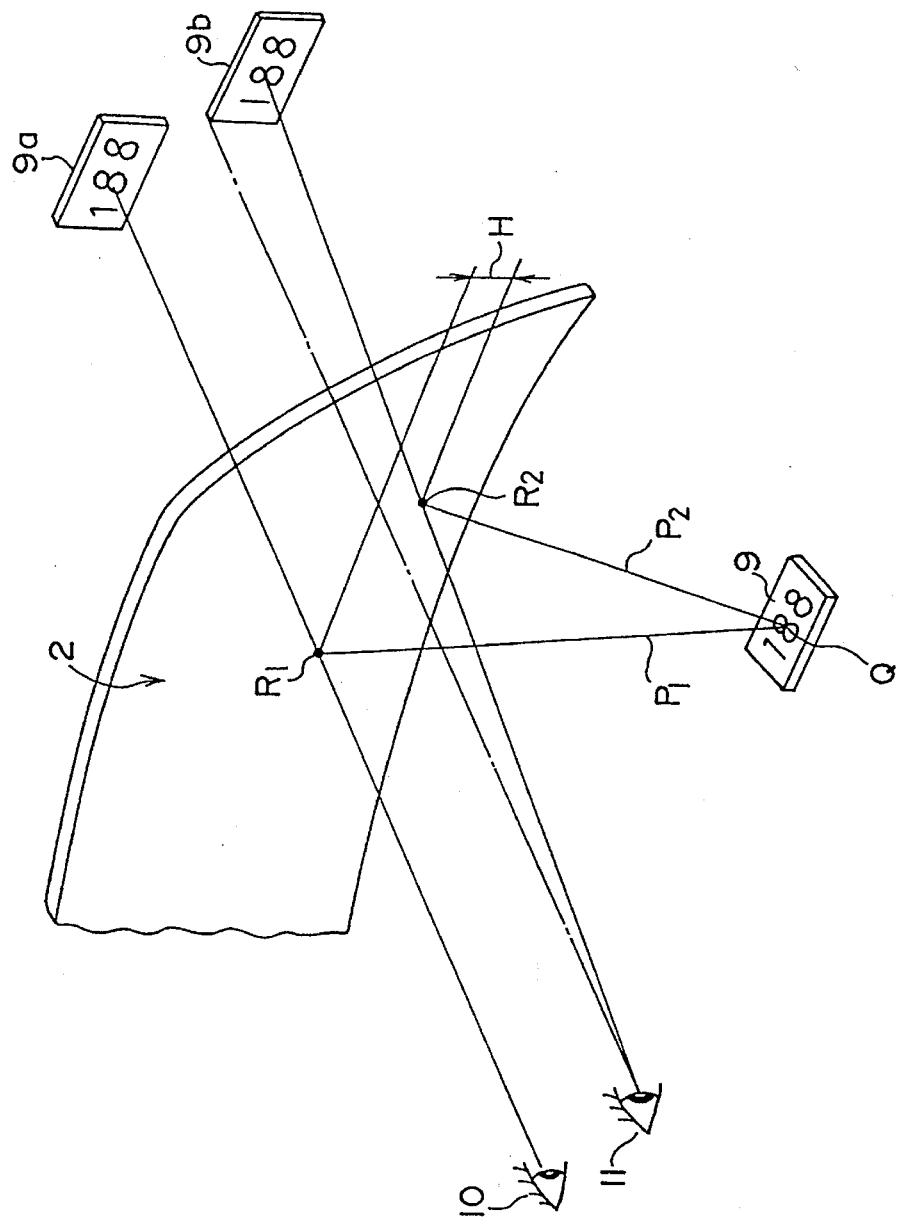
FIG. 4 is a schematic view showing a reflecting condition of an image information through a front glass.
Figure 5:
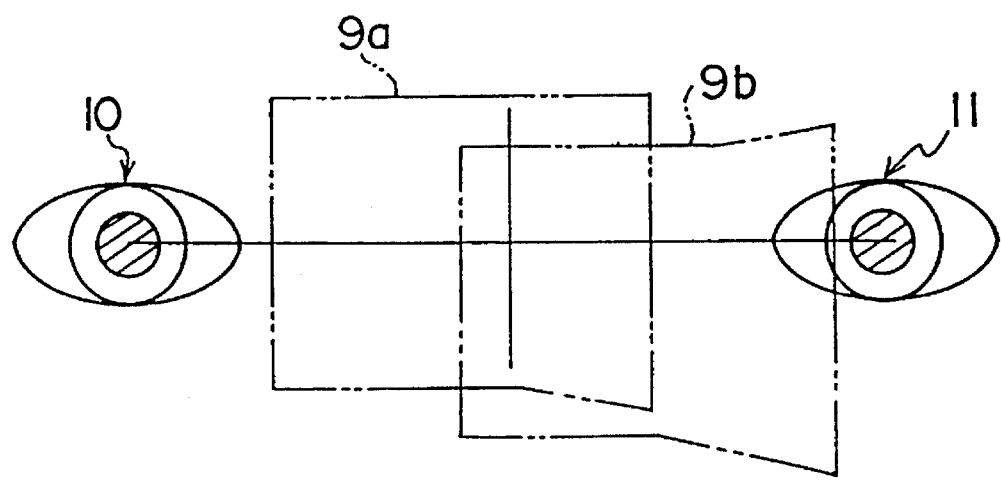
FIG. 5 is an explanatory view for explaining a positional displacement (discrepancy) between two overlapping images (double image) due to difference in curvature of the front glass.
Figure 6:
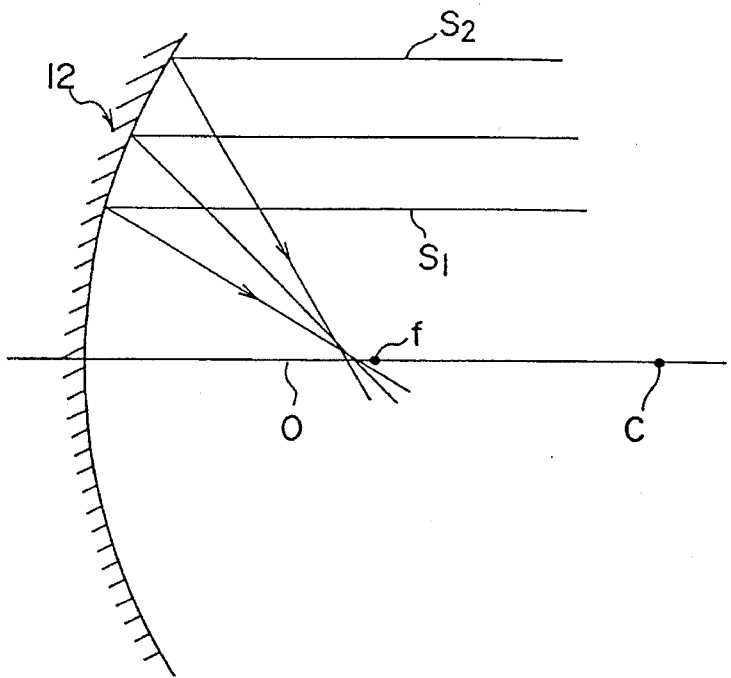
FIG. 6 is an explanatory view for explaining possible inconveniences occurrable when a spherical concave mirror is used as a middle mirror.
Figure 7:
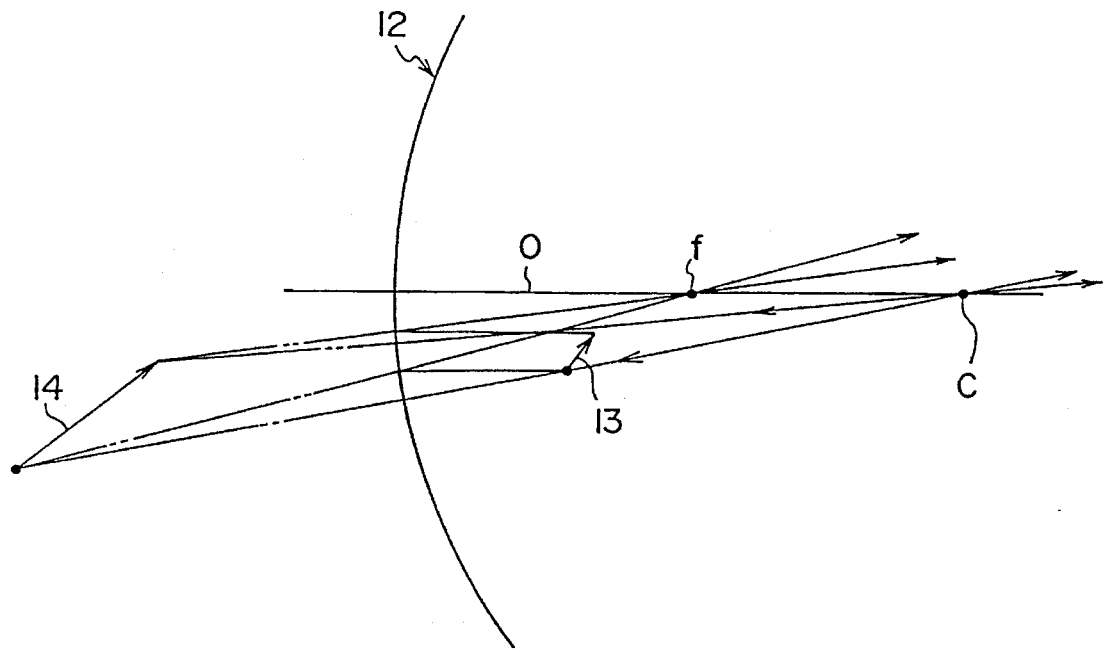
FIG. 7 is an illustration showing an imaging relation (or condition) through the concave mirror of FIG. 6.

In FIGS. 2 and 4, the image information 9 is present below the front glass 2 only for the sake of convenience of simplicity and explanation. Actually, this image information 9 is reflected in the plane mirror.

What is claimed is:

1. An apparatus for a head up display for use in a motor vehicle, comprising:

a curved front glass;

a reflective surface formed in said curved front glass;

a projector for projecting image information, said image information projected by said projector being reflected on said reflective surface in a direction where said image information is seen by eyes of a person riding in the motor vehicle wherein said image information is presented forwardly of said front glass; and a first mirror mounted on said projector for reflecting said image information toward said reflective surface, said first mirror including a portion of a parabolic reflective face located spaced away from a main axis of a parabolic mirror, wherein said portion of said parabolic reflective face includes a first curved surface having a smaller curvature, corresponding to a portion of said curved front glass which has a larger curvature, and a second curved surface having a larger curvature, corresponding to a portion of said curved front glass which has a smaller curvature.

2. An apparatus for a head up display for the use in a motor vehicle according to claim 1, further comprising an instrument panel, said projector being disposed inside said instrument panel.

3. An apparatus for a head up display for the use in a motor vehicle according to claim 1, wherein said reflective surface is semitransparent.

4. An apparatus for a head up display for the use in a motor vehicle according to claim 2, wherein said reflective surface is semitransparent.

5. An apparatus for a head up display for the use in a motor vehicle, comprising:

a curved front glass;

a semitransparent reflective surface formed in said front glass;

an instrument panel;

a projector disposed inside said instrument panel for projecting image information;

said image information being reflected on said reflective surface toward eyes of a person riding in the motor vehicle to present an image of said image information forwardly of said front glass in an overlapped relation to a foreground; and a first mirror mounted on said projector for reflecting said image information toward said reflective surface, said first mirror including a portion of a parabolic reflective face which is located away from a main axis of a parabolic mirror;

said portion of said parabolic reflective face including a first curved surface having a smaller curvature, corresponding to a portion of said front glass which has a larger curvature, and a second curved surface having a larger curvature, corresponding to a portion of said front glass which has a smaller curvature, wherein distortion of said image information due to differences in curvature of said front glass is corrected and a height-wise positional displacement of a double image, which double image may occur when said image information viewed by a person riding in the motor vehicle, is corrected.

* * * * *